United States Patent [19]

Utzmann

[11] 4,209,957
[45] Jul. 1, 1980

[54] ARRANGEMENT AND PROCESS FOR ACTIVATING AND ARRESTING THE OPERATION OF A HEAT-FORMING MACHINE

[75] Inventor: René Utzmann, Falaise, France

[73] Assignee: Ste d'Application Plastique, Mecanique et Electronique Plastique-Mecanique S.A., Falaise, France

[21] Appl. No.: 949,579

[22] Filed: Oct. 10, 1978

[30] Foreign Application Priority Data

Oct. 8, 1977 [DE] Fed. Rep. of Germany ....... 2745422

[51] Int. Cl.² .......................... B65B 1/02; B65B 3/02; B65B 5/02
[52] U.S. Cl. ...................................... 53/453; 53/561; 34/41; 219/354; 264/101
[58] Field of Search ................ 53/561, 559, 329, 373, 53/64, 67, 433, 442, 453, 456; 264/101; 219/354, 347, 348; 34/41, 49, 4; 425/384; 156/497, 499

[56] References Cited

U.S. PATENT DOCUMENTS

| | | | |
|---|---|---|---|
| 3,000,157 | 9/1961 | Ollier et al. | 53/559 |
| 3,127,497 | 3/1964 | Taylor, Jr. | 219/354 X |
| 3,389,535 | 6/1968 | Arnetti | 53/559 |
| 3,826,014 | 7/1974 | Helding | 34/41 X |

Primary Examiner—Horace M. Culver

[57] ABSTRACT

An improved process and heating arrangement for actuating and arresting a heat-forming machine for producing deep drawn containers made of thermoplastic foil band material. The foil band material is paid out in stepwise fashion from one or more storage rollers and is then processed along a process path along which there are arranged in downstream fashion: a heating arrangement, a molding arrangement, a filling arrangement, a stamping arrangement and a driving mechanism. Control circuit means are operatively connected to all of the afore-recited arrangements. The heating arrangements includes heating elements for heating the foil band material to the molding temperature. Screening plates are slidably mounted in the heating arrangement between the foil band material and the heating elements. The control circuit means first cause the screening plates to move in a direction opposite to the feed direction of the foil band material out of the heating arrangement to thereby expose a predetermined portion of the foil band material to heating until it has reached a forming temperature. The foil band material is then moved in stepwise fashion via the control circuit means and driving mechanism through the afore-recited arrangements; the actuation of the arrangements and timing of the movement being controlled by the control circuit means.

16 Claims, 11 Drawing Figures

FIG. 2

ARRANGEMENT AND PROCESS FOR ACTIVATING AND ARRESTING THE OPERATION OF A HEAT-FORMING MACHINE

BACKGROUND OF THE INVENTION

This invention relates to a process and an arrangement for activating and arresting the operation of a heat-forming machine for manufacturing deep drawn plastic containers out of thermo-plastic foil material. This application relates to a copending application of the same inventor and is co-assigned with the instant application, filed on Sept. 28, 1978. and entitled ADVANCING ARRANGEMENT FOR ADJUSTABLE STEP-WISE ADVANCING DISTANCE. In this heat-forming machine there is paid out from a storage roller a foil band which is guided first to a heating arrangement and then to a molding and deforming arrangement and thereafter passes through a filling arrangement. A second storage roller pays out a cover strip which is welded on top of the deformed foil band in a welding arrangement. Finally the so-welded band is passed through a punching and ejecting arrangement. The heating arrangement includes upper and lower arranged heating elements which are mounted above and below the path through which the foil band material travels. The heating arrangement further includes screening plates which are slidably mounted between the heating elements and the foil band material. These plates serve to protect the foil band material against successive heating by the heating elements.

The invention furthermore includes the process for carrying out the activating and arresting of the heat-forming machine of the invention.

A heat-forming machine of the afore-described type is described in German published patent application No. 1 145 784 which corresponds to U.S. Pat. No. 3,000,157.

In the heat-forming machines forming the state of the art, the foil cover material is pulled off from a storage roller and then pulled through the entire machine until it is gripped by a drive mechanism disposed at the end of the machine. In a similar manner the covering foil band material is pulled through the machine, thereafter the screening plates are pulled out of the heating arrangement and the machine is put into operation. In this known arrangement there exists the possibility to keep the filling arrangement inactive until a flow-free container is formed from the foil band material and has reached the operative region of the filling arrangement. In order to stop the operation of the machine, the screening plates are pushed into the heating arrangement and the machine can thereafter be stopped.

Obviously there results a great waste of foil band material in this type of procedure in view of the fact that the foil band material must be completely pulled through the machine before the machine is operational so that the region of the foil band material disposed between the heating arrangement and the drive mechanism for pulling the foil band is not usable. A similar drawback results at the time of arresting the heat-forming machine. This is evident from the fact that in the known heat-forming machines it is not possible to process completely the already formed containers which have not yet reached the punching and ejection mechanism.

A further drawback in the known heat-forming machines resides in that even just a temporary stopping of the machine produces a waste of the material that has already been formed but has not yet reached the stamping and ejection mechanism.

A further drawback of the known heat-forming machines resides in that even a temporary stopping of the machine causes the waste because thereafter a long segment of the thermo-plastic foil band material can no longer be used. This is evident from the fact that in the known machines the foil band material is subjected to a plurality of successive process steps before the foil band material has been completely processed.

Lastly, there results a considerable amount of waste of foil band material when a storage roller approaches its end and the end of the foil band material must be glued to the starting end of a new foil band material roll. In such a case the machine must be arrested before reaching the region in which the two ends of the foil band material are glued to each other and the glued together portion has reached the heating arrangement; thereafter the entire foil band material strip must be pulled through the machine up to the region in which the two ends have been glued together prior to the re-activating of the heat-forming machine. This is due to the fact that the glued region can obviously not be processed through the heat-forming machine, so that it is necessary to interrupt the heat-forming process in that region. Since, however, as has been described hereinabove, the temporary interruption of the forming process and the immediate subsequent actuation of the subsequent arrangements is not possible with the known heat-forming machines, it is only possible to operate these known heat-forming machines in the afore-described manner.

SUMMARY OF THE INVENTION

It is a general object of the invention to provide a process and arrangement wherein the activating and arresting of a heat-forming machine of the afore-described type is provided with results that achieve no waste or very little waste of foil band material, formed containers and eventually of material to be stored in the containers.

The arrangement of the invention makes it possible that as soon as the machine is put into operation and after arresting the operation of the machine, containers are immediately formed at the starting end of the foil band material without waste and the various processing means of the machine continue to work the foil band material and after the machine is arrested, the foil band material and the last-formed container are guided through the machine and are processed through the machine without having to pull the non-deformed foil band material through the machine. The non-deformed material is not damaged by the arrangement in a manner that after cutting off the last-formed container the foil band material can be pulled back to the heating arrangement and after reactivating the machine can again be used as the starting material for the heat-forming machine for forming the containers.

It is a further object of this invention to provide a machine having the possibility of interrupting the heating and forming process for the containers during a few advancing steps without having to interrupt the advancement of the foil band, so that the already formed containers can be processed through the subsequent downstream arranged mechanisms and can, after lifting the interruption of the forming process, be worked on in the downstream arranged mechanisms. Similarly, the containers can again be formed in the foil band material after the lifting of the interruption of the forming process on the foil band without any additional process steps being required.

This possibility inherent in the machine of the invention serves primarily to pass the glued ends of foil band material through the machine without subjecting it to the working of the various mechanisms.

It is a further object of this invention to provide the possibility of interrupting the step-wise advancing mechanism without thereby interrupting the forming process for the foil band material and the subsequent processing thereof. Such an interruption of the step-wise advancing mechanism can, for example, have the advantage when it becomes necessary during the operation of the machine to adjust certain mechanisms at the individual process stages or at the advancing drive mechanism.

The advantages of this invention reside in that in heat-forming machines, which are designed to manufacture containers, there can be provided, on the one hand, a simple controlling of the heating arrangement of the machine by means of which the first sufficiently heated foil band material can be formed, without thereby producing insufficiently heated foil band material which is wasted. Similarly, there can, when arresting the machine, that region of the foil band material which is already disposed within the heating arrangement be disposed so that this heated region thereof, which when cooled would normally become unusable, does not become a waste product in the process of this invention.

The heat-forming machine of this invention, which in addition to the forming mechanism has a cover foil band sheet welding arrangement and a stamping arrangement, has, in accordance with further features of the invention, the advantage that in these regions there occurs no waste due to non-formed foil band material pieces or due to already formed foil band material pieces or due to the containers that are present in the foil band material which in the afore-mentioned arrangements of the state of the art cannot be processed. The arrangement and process of the invention provides for a coordination of the adjustment of the heating arrangement with the adjustment of the remaining work stations of the heat-forming machine, so that a fully automatic actuation and arresting of the heat-forming machine can be carried out, whereby practically no waste results due to non-processed or non-worked or poorly worked foil band material.

BRIEF DESCRIPTION OF THE DRAWING

The invention is further set forth in the following detailed description taken in conjunction with the appended drawing, in which.

DETAILED DESCRIPTION

Figure 1:
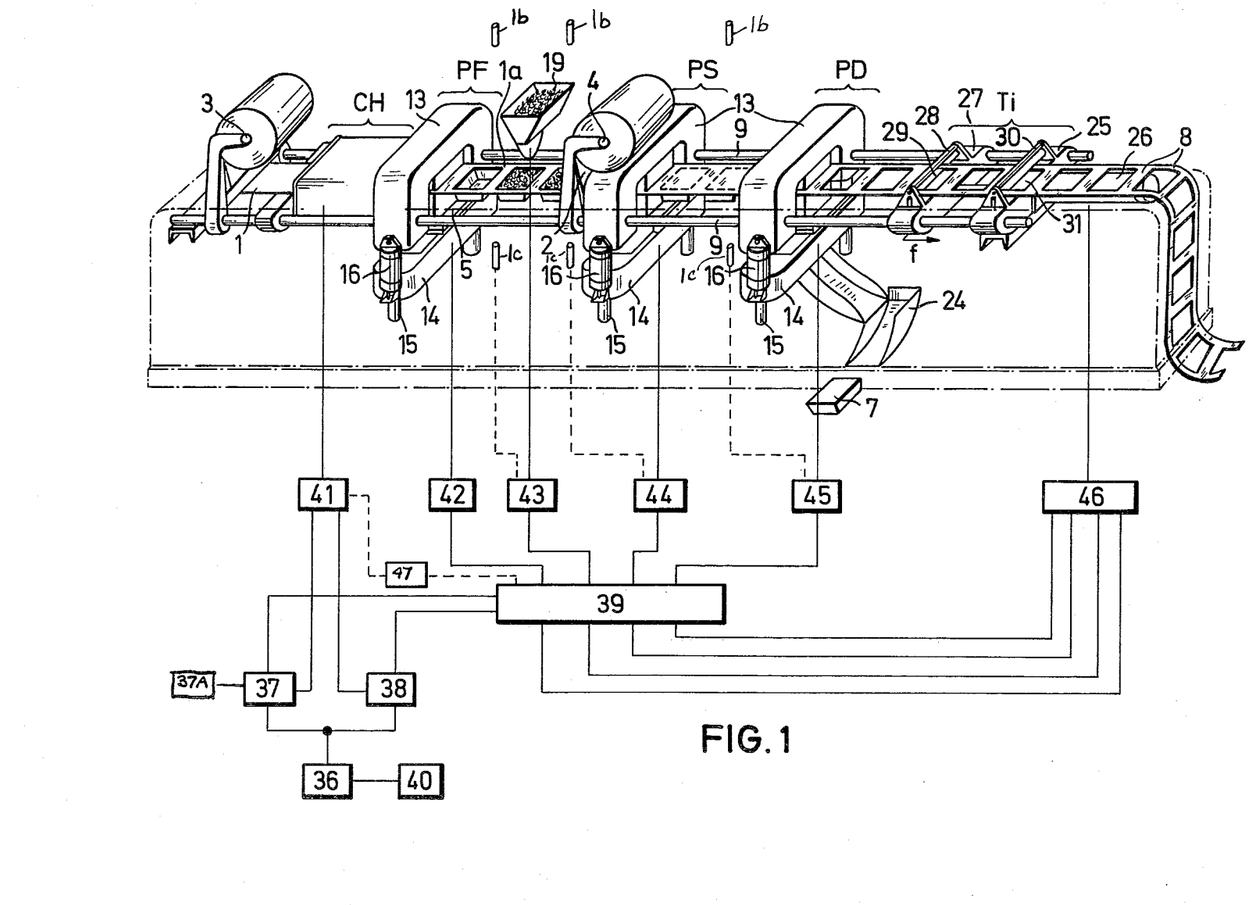
FIG. 1 is a schematic, perspective view of a heat-forming machine having a control arrangement shown as a block diagram in accordance with this invention.

As can be noted from the drawing the heat-forming machine processes a band 1 made out of thermo-plastic foil material which is paid out from a storage roller 3 and pulled from it and travels through a heating arrangement CH and a forming arrangement PF wherefrom it exits as a deformed band 1a. Thereafter the band 1a travels through a foil band welding arrangement PS and a stamping arrangement PD. The foil material 1, 1a and the grate-like band 8 that remains after passing through the stamping arrangement PD are pulled through the heat-forming machine by means of a driving mechanism TI. The cover foil band 2 is simultaneously paid out from a second storage roller 4 and is welded onto the deformed band 1a in the region of the welding arrangement PS. The forming arrangement PF, the sealing arrangement for the cover foil band PS and the stamping arrangement PD are similarly constructed. Each of the aforementioned arrangement comprises a bracket 13 which is slidably mounted on the pair of guide rails 9 and can be secured thereon. The brackets 13 are supported on base plates 14 by means of downwardly extending columns 15 which are movably mounted in mating boards of the base plates 14. The supporting arrangement further includes a pair of pneumatic or hydraulic cylinders 16 which cushion the support of the brackets 13 on the base plates 14. As can be noted, the hydraulic or pneumatic cylinder piston arrangements 16 are secured both on the brackets 13 and the base plates 14. There is illustrated schematically a mold 5 in the molding arrangement PF. The tools for the welding arrangement PS and the stamping arrangement PD are not illustrated for sake of clarity but are conventional tools. A filling arrangement 19 is mounted in the region between the molding arrangement PF and the welding arrangement PS.

The drive mechanism TI comprises a support member 25 mounted on the pair of guide rails 9 which also serves as a bearing support for the hydraulic or pneumatic working cylinder 26 for actuating the driving mechanism TI. A pair of clamping rollers 30, 31 are rotatably mounted on the support member 25 for guiding the grate-like remainder foil band 8 therethrough. These clamping rollers 30, 31, which are freely rotatably, prevent a movement of the grate-like remainder foil band 8 opposite to the movement of the advancing mechanism. The piston rod of the hydraulic or pneumatic working piston cylinder arrangement 26 acts on a support member 27 which is slidably mounted on the pair of guide rods 9. This support member 27 is also provided with a pair of clamping rollers 28, 29 rotatably mounted thereon for guiding the grate-like remainder foil band 8 thereto. The clamping rollers 28, 29 are freely rotatably on the support member 27. The mode of action of the pair of clamping rollers is such that when the supporting member 27 moves in the direction of the arrow f the pair of rollers 28, 29 are blocked in their rotary movement and thereby entrain the remainder grate-like foil band 8, the deformed foil band 1a and the foil material 1 in the direction of the arrow f. During the return movement of the support member 27 the pairs of rollers 28, 29 release the remainder grate-like foil band 8 which is, however, prevented to move backwardly by means of the rollers 30, 31. Thereby the support member 27 with the rollers 28, 29 can be moved opposite the direction of the arrow f while the remainder grate-like foil band 8, the deformed band 1a and the non-deformed foil material 1 remains stationary. In this manner a step-wise advance of the foil material 1, the deformed band 1a and the remainder grate-like foil band 8 is attained, while the foil material 1 is heated in the heating arrangement CH, is deformed in the molding arrangement PF, the formed containers are filled by means of the filling arrangement 19, the cover foil band 2 is welded onto the deformed foil band 1a in the welding arrangement PS and finally, the finished closed container 7 are stamped out in the stamping arrangement PD and exit via a slide 24 from the machine. The manner of operation and the construction of the individual working mechanisms and arrangements are described in detail in the afore-mentioned German Pat. No. 1 145 784 and the corresponding U.S. Pat. No. 3,000,157. In view of the fact that only the heating arrangement CH has been improved with respect to the afore-mentioned heat-forming machine, it is this heating arrangement which is described in detail hereinafter and is illustrated in detailed FIG. 2.

The control for the heat-forming machine includes a pulse generator 36, an on switch and off switch 38 a slide register 39 and an emergency-off-switch 40 as well as a control element 41 for the heating arrangement CH, a control element 42 for the molding arrangement PS, a control element 43 for the filling arrangement 19, a control element 44 for the cover foil band welding arrangement PS, a control element 45 for the stamping arrangement PD and a control element 46 for the advancing drive arrangement TI. All of these circuit elements are conventional and have not been illustrated and described in detail.

Figure 2:
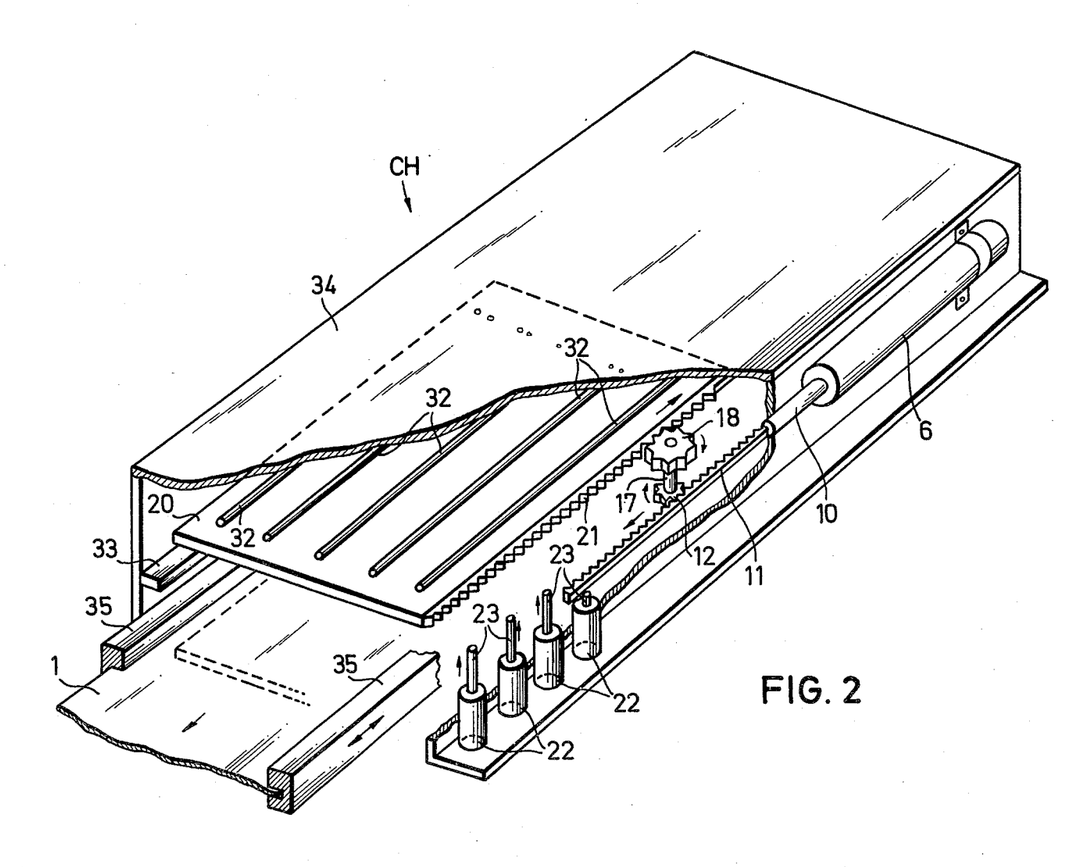
FIG. 2 is a schematic view in perspective of the heating-arrangement, partially cut away.

As can be noted from FIG. 2, the thermoplastic foil band material 1 is guided to the heating arrangement CH by means of a pair of band guide members 35. The heating arrangement CH comprises a cover 34 in which there are operatively mounted a plurality of heating elements 32. A screening plate 20 is slidably mounted between the plurality of heating elements 32 and the foil band 1. This screening plate 20 is preferably water-cooled by non-illustrated conventional water-cooling means. The screening plate 20 is slidably supported by guide rails 33. The slidably displacement of the screening plate 20 is effected by means of a hydraulic or pneumatic working piston cylinder 6, the piston 10 of which is provided with a toothed rack 11 which coacts with a gear wheel 12. This gear wheel 12 is mounted on a shaft 17 at the upper end of which a further gear wheel 18 is coaxially secured. This gear wheel 18 coacts with a toothed rack 21 which is secured to the screening plate 20. The gear wheels 12, 18, respectively mesh with the toothed racks 11, 21. Along the path of the toothed rack 11 there are mounted a plurality of adjustable stops in the form of hydraulic or pneumatic working cylinder piston arrangements 22, the piston rods 23 of which are adapted to be slidably moved into the path of the toothed rack 11.

The distances between the hydraulic or pneumatic working cylinder piston arrangements 22 are such that, considering the gear transmission between the toothed rack 11, the gear wheel 12 as well as the gear wheel 18 and the toothed rack 21, there is effected a slidable displacement of the screening plate 20 corresponding to one advancing step P.

Figure 2A:
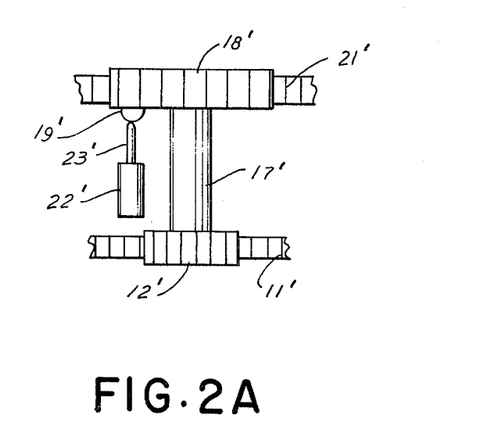
FIG. 2A is a detail of one embodiment which coacts with the heating arrangement of FIG. 2.

There is to be mentioned in this connection that the adjustable stops can be constructed differently from the embodiment illustrated in FIG. 2. For example, there can be provided a pin 19' on a gear wheel 18' which in connection with the hydraulic or pneumatic working cylinder 22' forms an adjustable stop in conjunction with a piston rod 23', whereby each rotation of the gear wheel 18 corresponds to one advancing step P.

In such an alternate embodiment the adjustable stop for each step of the screening plate 20 is newly adjusted, whereas in the illustrated embodiment the hydraulic or pneumatic working cylinders 22 are successively adjusted. As will be described hereinafter, the screening plate 20 is step-wise movable opposite the advance direction of the foil band material 1 as well as also synchronously with the advancing steps of the foil band material 1. This effect can be achieved by making the hydraulic or pneumatic working cylinder piston arrangement 6 a double-acting one and the adjustable stop surfaces of the piston cylinders 22, 23 can be acting in both directions of movement of the toothed rack 11 in order to limit the step advance distance. Alternately, the hydraulic or pneumatic working cylinder piston arrangement 6 can simply be constructed so as to be simply acting and to coact in a non-illustrated manner with the screening plate 20 and the advancing mechanism for the foil band 1 so that the hydraulic or pneumatic working piston and cylinder 6 effects the slidable displacement of the screening plate 20 in a direction opposite to that of the step-wise advancing arrangement, whereas the slidable displacement of the screening plate 20 in the direction of the advancing mechanism is effected by means of the advancing mechanism drive TI.

Furthermore, the heating arrangement CH can be provided with heating elements 32 above and below the path of movement of the foil band 1. In such a case there must also be arranged underneath the foil band 1, between the heating elements 32 and the foil band 1, a screening plate 20 which is movable in an identical manner as has been described hereinabove.

The length of the heating arrangement CH amounts to five advancing step distances P.

Figures 3A, 3B:
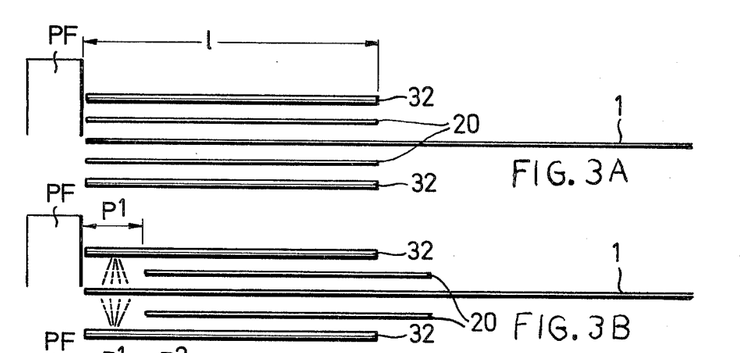
FIGS. 3A-3G illustrate schematically the individual stages of the heat-forming machine during the actuation and arresting thereof.
Figures 3C, 3D, 3E:
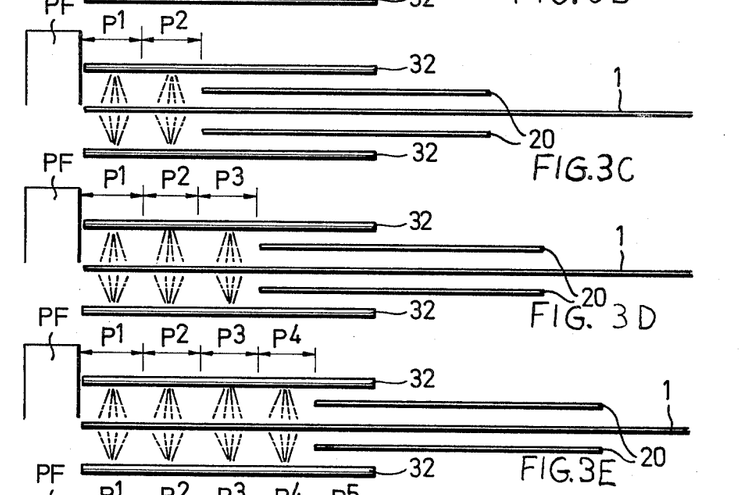
Figures 3F, 3G:
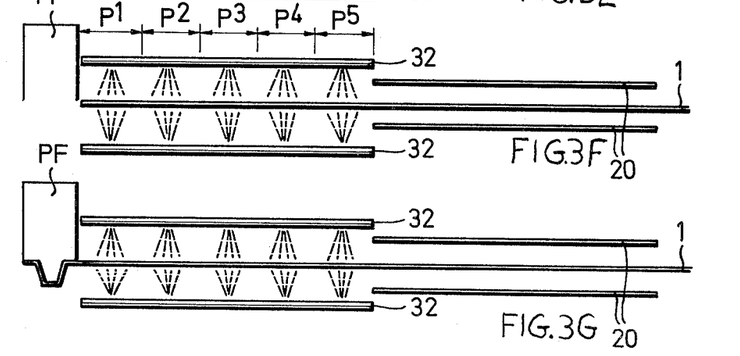

When actuating the heat-forming machine, the following occurs:

After the pulse generator 36 has been switched on by a non-illustrated common main switch, the on-switch 37 is actuated. Thereby the pulse signals of the pulse generator 36 reach the slide register 39, as well as the control element 41 for the slidable drives 6, 10, 11, 12, 17, 18, 21 of the screening plate 20. Each pulse which reaches the control element 41 causes the screen plate 20 to advance one step P out of the heating arrangement CH (FIG. 3) by actuating conventional non-illustrated pneumatic or hydraulic actuating means, so that a corresponding length of the heating element 32 becomes effective. The slide register 39 counts each one of these pulses, but this conventional non-illustrated circuit is so adjusted, that none of these pulses can reach the control elements 42, 44, 45, 46 as long as the slidable movement of the screen plate 20 has not ended.

As can be noted from FIG. 3, there is exposed to the heating elements 32 the entire foil band material that is located in the heating arrangement CH. The foil band material that is located most proximate to the molding arrangement PF at a step distance P is heated precisely as long as necessary to reach the necessary temperature for molding and with the sixth pulse is transported into the molding arrangement PF. That means that the sixth pulse reaches via the slide register 39 the control element 46 for activating the advance drive TI, so that the foil band 1 is moved forwardly one step distance P, thereby reaching the molding arrangement PF. At that point, after termination of the advancing motion, and adjusted by means of the same pulse, it is molded by means of the actuation of the control element 42.

Figure 1A:
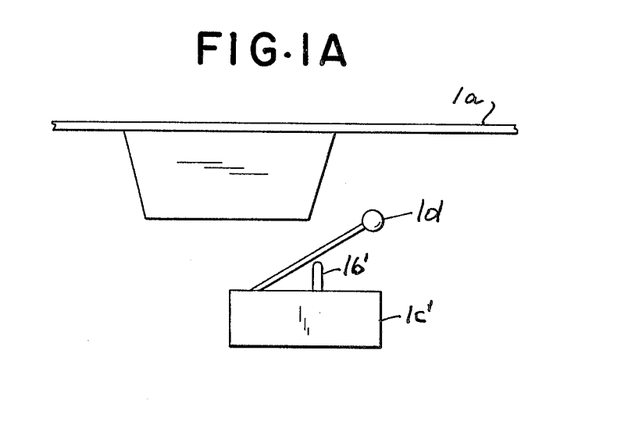
FIG. 1A is a detail of one embodiment which coacts with the control arrangement of FIG. 1.

As can be noted from FIG. 3 the foil band 1 only passes through the heating arrangement CH until it arrives immediately in front of the molding arrangement PF so that, after termination of the heating process, immediately the front leading end 1 of the foil band is molded. Thereafter the heat-forming machine continues to operate stepwise whereby there is activated via the slide register 39 the next-following arrangement, namely the filling arrangement 19, as soon as the first-formed container has reached the region of the filling arrangement 19. The same applies to the welding arrangement PS which is actuated after the filling arrangement 19, whereas the stamping arrangement PD is actuated last by the slide register 39. Scanning means can be provided to detect the presence or absence of a formed container in the foil band 1a. The scanning means can be formed by a light beam source and photocell 1b, 1c which is operatively connected to each of the control elements 43, 44, 45. Alternately a microswitch 1b', 1c' is provided which has a pivotable feeler arm 1d adapted to detect the presence and/or absence of containers in the foil band 1a.

The distance between the molding arrangement PF, the filling arrangement 19, the welding arrangement PS and the stamping arrangement PD is maintained at one or more a multiple of the step distances P, so that the outputs of the slide register 39 are switched in such a way that the actuation of the control arrangement 42, 43, 44, 45 occurs after a particular pulse number corresponding to the distances between the respective arrangements. If, for example, the distance between the individual arrangements is five step distances P, then these arrangements are correspondingly timewise actuated with respect to each other in a time-sequence corresponding to five pulses.

In order to reactivate the heat-forming machine after a prolonged downtime, it can become necessary to heat the front end of the foil hand 1 in the heating arrangement CH somewhat longer as corresponds to the pulse times in normal operation. For this purpose there can be provided an auxiliary delay switch 37A at the on-switch 37, which acts on the pulse generator 36 and which slows this pulse generator down correspondingly. This delay circuit can be adjusted manually or automatically so that after a predetermined number of pulses the normal pulse velocity is again obtained.

When arresting the machine, the off-switch 38 is actuated, whereby first of all there is introduced via the control element 41 a slide motion for the screening plate 20 which is parallel to and in the same sense and synchronous with the advancing step movement of the foil band material 1.

In this manner, similar to the activation of the heat-forming machine, the region of the film band 1 which is covered by the screening plate 20, is guided up to the molding arrangement PF, whereafter the molding arrangement PF is the first one to be stopped. The slide register 39 is furthermore actuated by the pulse generator 36, so that the control element 43 does not only receive any further control pulses for the filling arrangement 19, only after, for example, five further emitted pulses. Similarly, the control pulses for the control element 44 and the control element 45 are terminated, whereby the control element 46 for the advancing drive TI receive the last pulse by means of the control element 45. In this manner all containers formed in the foil band 1 are processed, whereas the non-deformed foil band 1 after cutting off of the remainer grate-like foil band 8 is pulled back up to the heating arrangement CH so that the heat-forming machine can be placed anew into operation without any waste.

In order to avoid a complete arresting of the heat-forming machine when a storage roller 3 has been exhausted and needs to be replaced by a new storage roller, the control mechanism of this invention is constructed in such a way that the heating of the foil band 1 and the molding of the containers in the molding arrangement PF can be interrupted for a few pulse times by means of the switching element 47. During these pulses the end piece of the foil band 1 which is to be glued together with the front end of the band of a new storage roller 3 by means of an adhesive tape is guided through the machine without effecting at this spot a deformation and without the glued region of the foil band translating through the machine causing an actuation of the remaining arrangements. In such a case the slide register 39 is controlled so that the pulse numbers for the interruption of the slide register are such that the actuation of the individual arrangements is interrupted during this pulse number in accordance with the distances between the various arrangements.

Although the invention is illustrated and described with reference to a plurality of preferred embodiments thereof, it is to be expressly understood that it is in no way limited to the disclosure of such a plurality of preferred embodiments, but is capable of numerous modifications within the scope of the appended claims.

What is claimed is:

1. An improved process for actuating and arresting a heat-forming machine for producing deep drawn containers made of thermoplastic foil band material, wherein said foil band material is paid out in stepwise fashion from at least one storage roller operatively mounted in the heat-forming machine, and is guidingly fed in stepwise fashion in a feeding direction successively along a processing path along which there are disposed a heating arrangement, a molding arrangement, a filling arrangement, a cover foil band sealing arrangement and a stamping arrangement, said heat-forming machine include heating elements operatively mounted above and below said processing path, and further including screening plates slidably movably mounted along a path parallel to said processing path and disposed between said heating element and said processing path; the improvement comprising the steps of first slidably moving said screening plates in a stepwise fashion in a direction opposite to the feeding direction out of said heating arrangement;

thereafter exposing said foil band material to heating in said heating arrangement until a forming temperature for a predetermined portion of the thermoplastic foil band material has been reached;

thereafter advancing said predetermined portion of foil band material into said molding arrangement;

thereafter actuating said molding arrangement; and continuing the aforerecited steps until said heat-forming machine is to be selectively arrested, whereupon first said slidably moving screening plates are moved in the same direction as the feeding direction into said heating arrangement;

thereafter arresting said molding arrangement; and thereafter arresting said feeding of said foil band material; slidably moving said screening plates in and out of said heating arrangement by at least two steps, the length of said steps corresponding to the length of the steps of said feeding of said foil band material; and adjusting the time during which said screening plates remain stationary so that a portion of the foil band material which is most proximate to the molding arrangement is selectively heated to the required forming temperature.

2. In the improved process for actuating and arresting a heat-forming machine, the improvement as set forth in claim 1, wherein the heat-forming machine includes control means operatively connected to said filling arrangement, sealing arrangement and stamping arrangement, and automatically actuating or arresting said three afore-recited arrangements independently from each other via said control means as long as a container formed by said molding means remains in one of said three afore-recited arrangements.

3. In a heat-forming machine for producing deep drawn containers of thermoplastic foil material having at least one storage roller operatively mounted in said machine and adapted to pay out in stepwise fashion thermoplastic foil band material, guiding means for guidingly feeding said foil band material in a feeding direction along a processing path, a heating arrangement, a molding arrangement, a filling arrangement, a cover foil band sealing arrangement and a stamping arrangement operatively mounted in downstream fashion along said processing path in said heat-forming machine, the improvement comprising,
an improved heating arrangement comprising heating elements operatively mounted in said heating arrangement above and below said processing path;
a pair of screening plates slidably movable along a path parallel to said processing path and disposed between said heating elements and said processing path;
adjustable sliding means operatively connected to said screening plates;
control circuit means connected to said adjustable sliding means, said control circuit means including a timing pulse circuit and a driving mechanism for advancing said foil band material in stepwise fashion along said processing path;
said control circuit means actuating said screening plates upon actuation of said heat-forming machine, whereby said screening plates move in stepwise fashion in a direction opposite to the feeding direction, and after termination of heating a predetermined portion of said foil band material in said heating arrangement actuating said driving mechanism;
said time pulse circuit including a pulse storage means which continues to transmit pulses to said control circuit means after receiving a stop pulse signal from said control circuit means until said screening plates have returned completely into said heating arrangement.

4. In a heat-forming machine, the improved heating arrangement as set forth in claim 3, wherein said adjustable sliding means include a first piston cylinder arrangement, a first piston rod reciprocally movably mounted in said first piston cylinder arrangement, said first gear rack, a first gear wheel meshing with said first gear rack, a second gear wheel coaxially mounted relative to said first gear wheel via a shaft, both gear wheels being rigidly secured to said shaft, said screening plates having at least one second gear rack secured thereon which meshes with said second gear wheel.

5. In a heat-forming machine, the improved heating arrangement as set forth in claim 4, including adjustable stop means operatively mounted in said heating arrangement and adapted to selectively stop the movement of said first piston rod.

6. In a heat-forming machine, the improved heating arrangement as set forth in claim 5, wherein said timing pulse circuit is operatively connected to said stop means.

7. In a heat-forming machine, the improved heating arrangement as set forth in claim 6, wherein said stop means include a plurality of second piston cylinder arrangements arranged parallel to the path of movement of said first piston rod, each one of said second piston cylinder arrangement having a second piston rod which is adapted to be selectively moved into the path of movement of said first piston rod to selectively stop the movement thereof.

8. In a heat-forming machine, the improved heating arrangement as set forth in claim 7, wherein said screening plates are disengeably connected to said driving mechanism.

9. In a heat-forming machine, the improved heating arrangement as set forth in claim 3, including scanning means operatively mounted in said machine and adapted to detect the presence or absence of a container formed in said foil band material in said filling arrangement, sealing arrangement and stamping arrangement, said scanning means being connected to said control circuit means so that when a signal indicating the absence of a formed container is received by said control circuit means from said scanning means said control circuit means arrest the operation of the afore-recited arrangements.

10. In a heat-forming machine, the improved heating arrangement as set forth in claim 9, wherein said scanning means include a lightbarrier transversely disposed relative to said processing path in said afore-recited arrangements and a photocell coacting therewith.

11. In a heat-forming machine, the improved heating arrangement as set forth in claim 3, wherein said timing pulse circuit includes a pulse generator, said pulse storage means being is in the form of a slide register which is operatively connected to said filling arrangement, molding arrangement, stamping arrangement and driving mechanism and sequentially actuating them in accordance with the distances between the afore-recited arrangements along said processing path, said slide register also being connected to said adjustable sliding means via an off-switch and an on-switch and a control element.

12. In a heat-forming machine, the improved heating arrangement as set forth in claim 11, wherein said off-switch includes a timing delay circuit which delays the corresponding pulses being transmitted to said slide register during the slidable movement of said screening plates.

13. In a heat-forming machine, the improved heating arrangement as set forth in claim 12, wherein the outputs of said slide register to be transmitted to the afore-recited arrangements are sequentially transmitted by said slide register, that upon receiving an actuating pulse from said on-switch and after receiving a number of first predetermined number pulses corresponding to the slidable movement of the screening plates, the molding arrangement and the driving mechanism are actuated via said slide register, and thereafter after receipt of a second number of predetermined pulses the filling arrangement, sealing arrangement and stamping arrangement are successively actuated, the second number of predetermined pulses corresponding to the number of advancing steps for covering the distances between the afore-recited arrangements.

14. In a heat-forming machine, the improved heating arrangement as set forth in claim 13, wherein the outputs of the slide register are connected to the molding, filling, sealing and stamping arrangements in such a way that after actuation of the on-switch or off-switch and after emission of a number of pulses from the pulse generator corresponding to the number of stepwise slidable movement of the screening plates, the molding arrangement and the other successively actuated or arrested after emission of a number of pulses from the pulse generator corresponding to the number of steps required to cover the distances between the respective afore-recited arrangements.

15. In a heat-forming machine, the improved heating arrangement as set forth in claim 14, including a delay switch means operatively connected to said on-switch for delaying the pulses which are emitted at normal operation therefrom to thereby delay the slidable movement of the screening plates in a direction opposite to the feed direction.

16. In a heat-forming machine, the improved heating arrangement as set forth in claim 14, including a switch element operatively connected to the slide register and to said adjustable sliding means for said screening plates to thereby deactivate said adjustable sliding means and partially deactive said slide register so that all arrangements except said driving mechanism are arrested.

* * * * *